US010382268B1

(12) United States Patent
Meyer et al.

(10) Patent No.: US 10,382,268 B1
(45) Date of Patent: Aug. 13, 2019

(54) CONFIGURATION FILE DISTRIBUTION USING A PASSIVE RECEIVING DEVICE

(71) Applicant: Amazon Technologies, Inc., Seattle, WA (US)

(72) Inventors: Timothy John Meyer, Oakton, VA (US); John Robert Stamper, Centreville, VA (US)

(73) Assignee: Amazon Technologies, Inc., Seattle, WA (US)

( * ) Notice: Subject to any disclaimer, the term of this patent is extended or adjusted under 35 U.S.C. 154(b) by 147 days.

(21) Appl. No.: 14/970,263

(22) Filed: Dec. 15, 2015

(51) Int. Cl.
*H04W 4/80* (2018.01)
*G06F 21/62* (2013.01)
*H04L 12/24* (2006.01)

(52) U.S. Cl.
CPC ...... *H04L 41/0843* (2013.01); *G06F 21/6209* (2013.01); *H04W 4/80* (2018.02)

(58) Field of Classification Search
None
See application file for complete search history.

(56) References Cited

U.S. PATENT DOCUMENTS

| 7,752,140 | B1 * | 7/2010 | Xu | G06F 21/121 |
| | | | | 705/59 |
| 9,584,498 | B1 * | 2/2017 | Forehand | H04L 63/08 |
| 2005/0283410 | A1 * | 12/2005 | Gosko | G06Q 30/06 |
| | | | | 705/26.44 |
| 2007/0106764 | A1 * | 5/2007 | Mansfield | H04L 12/2803 |
| | | | | 709/220 |
| 2009/0300148 | A1 * | 12/2009 | Gomes | G06F 15/177 |
| | | | | 709/220 |
| 2011/0289305 | A1 * | 11/2011 | Zimmer | G06F 21/44 |
| | | | | 713/1 |
| 2014/0181955 | A1 * | 6/2014 | Rosati | G06F 21/44 |
| | | | | 726/18 |
| 2015/0017910 | A1 * | 1/2015 | Li | H04B 5/0056 |
| | | | | 455/41.1 |
| 2017/0147323 | A1 * | 5/2017 | Hu | H04L 67/34 |

* cited by examiner

*Primary Examiner* — Yaotang Wang
(74) *Attorney, Agent, or Firm* — Thorpe North & Western, LLP.

(57) ABSTRACT

A technology is described for distributing a configuration file to network addressable devices. An example method may include receiving a configuration customization that is to be applied to the configuration settings of a non-configured network addressable device. A configuration file may be updated with the configuration customization. A request may be received to transmit the configuration file so that the configuration file may be applied to the configuration settings of the non-configured network addressable device. In response to the request, the configuration file may be identified and transmitted so that the configuration file may be applied to the configuration settings of the non-configured network addressable device, such that the configuration file may be read by the non-configured network addressable device and the configuration settings of the non-configured network addressable device may be set to values of the configuration file after powering the non-configured network addressable device for set-up.

22 Claims, 11 Drawing Sheets

CONFIGURATION FILE DISTRIBUTION USING A PASSIVE RECEIVING DEVICE

BACKGROUND

Electronic devices have become ever-present in many aspects of society. During the course of a normal day, a person may use a smart phone, a tablet device, and a laptop computer. Automobiles have come to rely upon electronic systems to control and monitor many features and operations. Modern home appliances such as, for example, washers, dryers, and refrigerators may be driven and controlled by electronic systems. Manufacturing facilities, building heating and cooling systems, and even farming equipment may now rely upon electronic sensors and control systems.

Advancements in communication technologies have allowed for even the simplest of these electronic devices to communicate with other devices and systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances and light switches offer the possibility of being configured with communication capabilities for purposes of transmitting status and receiving external controls.

DETAILED DESCRIPTION

Figure 1:
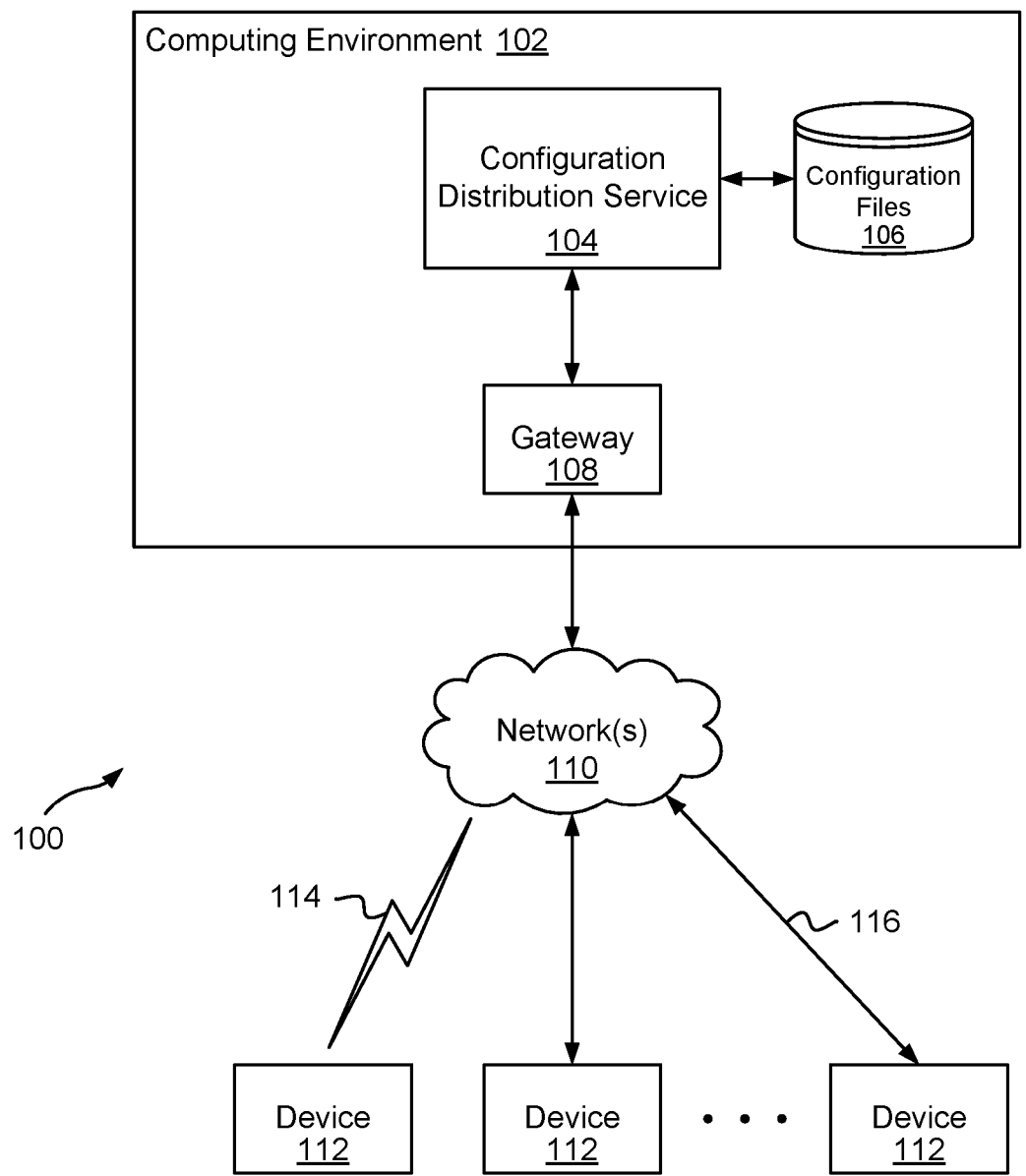
FIG. 1 is a block diagram illustrating an example system for distributing configuration files to network addressable devices via one or more networks.

A technology is described for distributing a customized configuration file to a network addressable device. For example, after the purchase of a device, a customized configuration file may be created and distributed to the device, and the configuration file may be applied to the configuration settings for the device. A network addressable device may be one of many devices that create an enormous network of addressable devices. This "network" is commonly referred to as the Internet of Things (IOT). The devices may be configured to communicate with services that are accessible via a network (e.g., a wired or wireless network), and the services in return may communicate with the devices via the network.

In one example of the technology, a configuration file may be created for a non-configured network addressable device which is in an unpowered state (e.g., a boxed device) or a powered state, and the configuration file may be uploaded to a configuration file distribution service. Various entities (e.g., manufacturers, distributors, suppliers, retailers, etc.) authorized to customize the configuration file may access the configuration file distribution service and modify settings of the configuration file for which the entities have been provided access. The customized configuration file may be encrypted and distributed to one or more network addressable devices using the configuration file distribution service. For example, a configuration file may be used to enable a manufacturer of network addressable refrigerators to assign a device identifier and a cryptographic key to a refrigerator made by the manufacturer. The manufacturer may upload a configuration file for the refrigerator to the configuration file distribution service. The refrigerator may then be shipped to a distributor or retailer who may be authorized to modify the settings of the configuration file. When the refrigerator is installed at a customer location, the refrigerator may be connected to a customer's network and the refrigerator may be configured to establish a connection with the configuration file distribution service. The encrypted customized configuration file may be sent to the refrigerator, and then decrypted and applied to the configuration settings of the refrigerator.

In another example, a network addressable device may be manufactured to include an integrated passive receiving device with writable memory (e.g., Radio Frequency Identification (RFID) module or Near Field Communication (NFC) tag). An encrypted configuration file may be written to the RFID module sometime after the manufacture of the device, and after powering up the device that is coupled to or is in wired communication with the passive receiving device (e.g., on the same printed circuit board), the configuration file may be read from the passive receiving device, decrypted and applied to the configuration settings of the device. For example, an electronic retailer of a network addressable device may contract with a manufacturer to produce the device. When a customer purchases the device from the electronic retailer, a customized configuration file may be created for the device that includes customer information included in a customer account maintained by the electronic retailer. In particular, the configuration file may include network credentials for the customer's network that allows the device to connect to the customer's network. The configuration file may be transmitted to the device from the configuration file distribution service via a passive receiving device programmer that writes the configuration file to the passive receiving device included in the device. When the device is powered up, the configuration file may be read and applied to the configuration settings of the device.

In the past, configuring a network addressable device to customer specifications often has been error prone and may have relied on knowledgeable installers who installed the device, which may have increased costs associated with obtaining the device. Alternative approaches have not adequately addressed the problem. For example, configuring a device prior to installation of the device may have involved unboxing the device at a manufacturer, distribution center, or some intermediate site and powering/booting the device and applying a customer specific configuration. As a result of the current technology, a customer specific configuration may be distributed to a network addressable device without the need of unboxing the device prior to installation and without the help of a knowledgeable installer. For example, the configuration file may be written to an RFID module included in the device so that the configuration file is available to be applied when the device is powered up for a first time, or the configuration file may be downloaded to the device when the device is powered up for a first time.

FIG. 1 is a diagram illustrating a high level example of a system 100 that may be used to distribute customized configuration files 106 to network addressable devices 112 via one or more networks 110. A configuration file 106 distributed to a device 112 may include customized configuration settings for a customer, business, environment, etc. and the configuration file 106 may be applied to the configuration settings of the device 112. For example, a configuration file 106 may include network credentials for a customer network, customer account details, configuration settings associated with a retailer, location settings, language settings, data and time settings, and other custom configuration settings.

As illustrated, the system 100 may include a computing environment 102 that includes various resources that are made accessible via a gateway 108 to devices 112 that access the gateway via the one or more networks 110. Illustratively, devices 112 may include network addressable electronic readers, printers, laptops, watches, light switches, lightbulbs, media players, voice command devices, video cameras, doorbell systems, door locks, smoke alarms, thermostats, security systems, as well as any other device that may be configured to communicate over a network 110.

Figure 8:
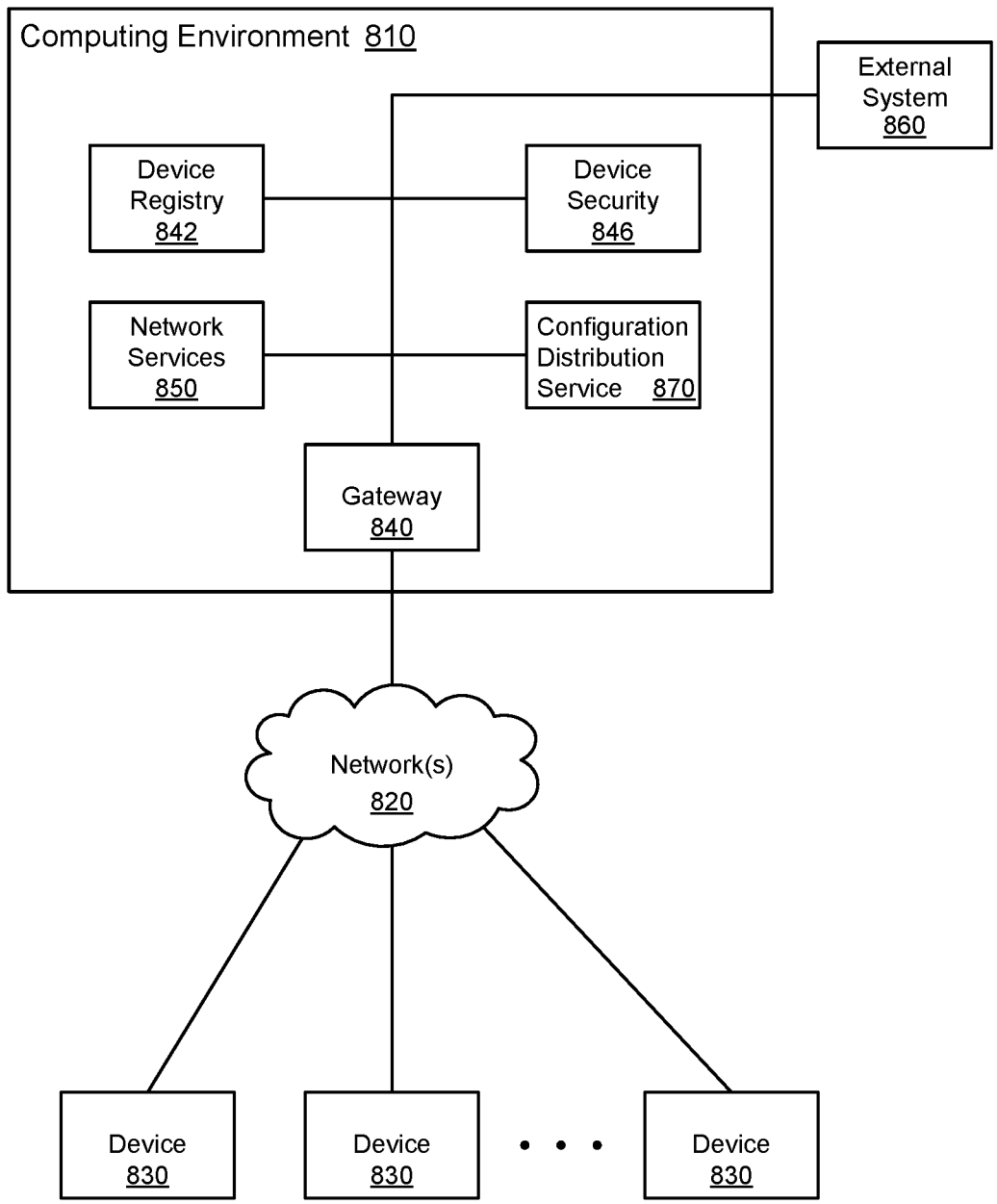
FIG. 8 is a block diagram illustrating an example computer networking architecture for providing network addressable devices access to network services.

As described in greater detail in association with FIG. 8, the devices 112 may access the computing environment 102 in order to access network services such as data storage and computing processing features. Network services operating in the computing environment 102 may communicate data and messages to the devices 112 in response to requests from devices 112 and/or in response to computing operations within the network services. A plurality of gateways 108 (e.g., gateway servers) may be accessible via the Internet and may operate to provide devices 112 with access to the computing environment 102 containing computing resources and to provide computing resources in the computing environment 102 with access to connected devices 112.

The computing environment 102 may include a configuration distribution service 104 that may be configured to distribute configuration files 106 to the devices 112. Configuration files 106 distributed by the configuration distribution service 104 may be encrypted and/or may be transmitted using a secure communication channel (e.g., Secure Socket Layer (SSL)). The configuration distribution service 104 may be a highly available service that is scalable in order to provide configuration files 106 to hundreds of thousands of devices 112. In one example, a configuration file 106 may include configuration settings that may be applied to a device 112. Some or all of the configuration settings may be customized prior to applying the configuration settings to the device 112. For example, a manufacturer of a device 112 may provide a configuration file 106 for a device 112, or for a product line of devices 112, that may be stored within the computing environment 102 and distributed to devices 112 using the configuration distribution service 104. The configuration file 106 may include default configuration settings as well as configuration settings that may be customized by the manufacturer or other authorized entities (e.g., an entity included in a distribution chain of the device 112). Entities authorized to customize a configuration file 106 may do so using a user interface provided by the configuration distribution service 104. For example, the user interface may allow a manufacturer and other authorized entities to modify configuration settings of a configuration file 106 that is stored within the computing environment 102 and encrypt the configuration settings using the manufacturer's cryptographic key or other authorized entities' cryptographic key.

In one example, the configuration distribution service 104 may be configured to receive requests for a configuration file 106, identify the configuration file 106 associated with the request, and send the configuration file 106 to the requester (e.g., to the device 112 or an RFID programmer as described later). A configuration file 106 may be assigned to a particular device 112, for example, using a device identifier, a customer account identifier, or an entity identifier. As such, a request for a configuration file 106 may include one or more identifiers that may be used to identify the configuration file 106. For example, a configuration file 106 may be customized for a particular device 112 and a request for the configuration file 106 may include a device identifier that may be used to identify the configuration file 106. In another example, a request for a configuration file 106 may include a customer account identifier and/or an entity identifier that may be used to identify a configuration file 106 associated with a customer account and/or entity. For instance, a retailer that sells a particular device 112 may configure the device 112 using a configuration file 106 provided by the device manufacturer and customized by the retailer. When selling or installing the device 112, the retailer may request the configuration file 106 from the configuration distribution service 104 using a retailer identifier and the configuration file 106 may be decrypted by the device 112 using the device's cryptographic key (which was installed during the manufacturing process) and the configuration file 106 may be applied to the configuration settings of the device 112.

In some examples, certain configuration settings included in a configuration file 106 may be modified at the time of a request for the configuration file 106. For example, a request for a configuration file 106 may include an account identifier that may be used to identify an account (e.g., a customer, distributor, or retailer account) and modify certain configuration settings using information obtained from the account. As an illustration, a device 112 may be manufactured and shipped to a distribution warehouse or retailer. The device 112 may be a non-configured device or may be a minimally configured device. After the device 112 is sold, a configuration file 106 which is customized may be created for the device 112. For example, a configuration file 106 may be created to include manufacturer default configuration settings for a device 112 (e.g., temperature, language, and power frequency settings) and additional configuration settings may be customized using information obtained from an account (e.g., customer network connectivity settings, customer location, and customer ID). The configuration file 106 may be distributed to the device 112 via a network 110 (wired 116 and/or wireless network 114) using the configuration distribution service 104 and the configuration file 106 may be applied to the configuration settings of the device 112.

Various methods may be used to distribute a configuration file 106 to a device 112. In one example, during installation of a device 112, connectivity to a network 110 may be established that enables the device 112 to connect to the configuration distribution service 104 and obtain a customized configuration file 106 directly from the configuration distribution service 104. In another example, a customized configuration file 106 may be provided to a device 112 that includes an integrated passive receiving device having writable memory by sending the configuration file 106 via the configuration distribution service 104 to a passive receiving device programmer and writing the configuration file 106 to the passive receiving device included in the device 112. Some passive receiving devices or tags may be powered by electromagnetic induction from magnetic fields produced near the passive receiving device by the passive receiving device programmer device, while other types may collect energy from the interrogating radio waves and act as a passive transponder. In yet another example, a device 112 may be configured to obtain network security credentials from a nearby device via a short-range network and then connect to the configuration distribution service 104 to obtain a configuration file 106 for the device 112. And in yet another example, a device 112 may obtain a configuration file 106 from a nearby like device via a short-range network (e.g., an installed device that is identical to the device 112). The various methods used to distribute a configuration file 106 to a device are explained in greater detail below.

Figure 2:
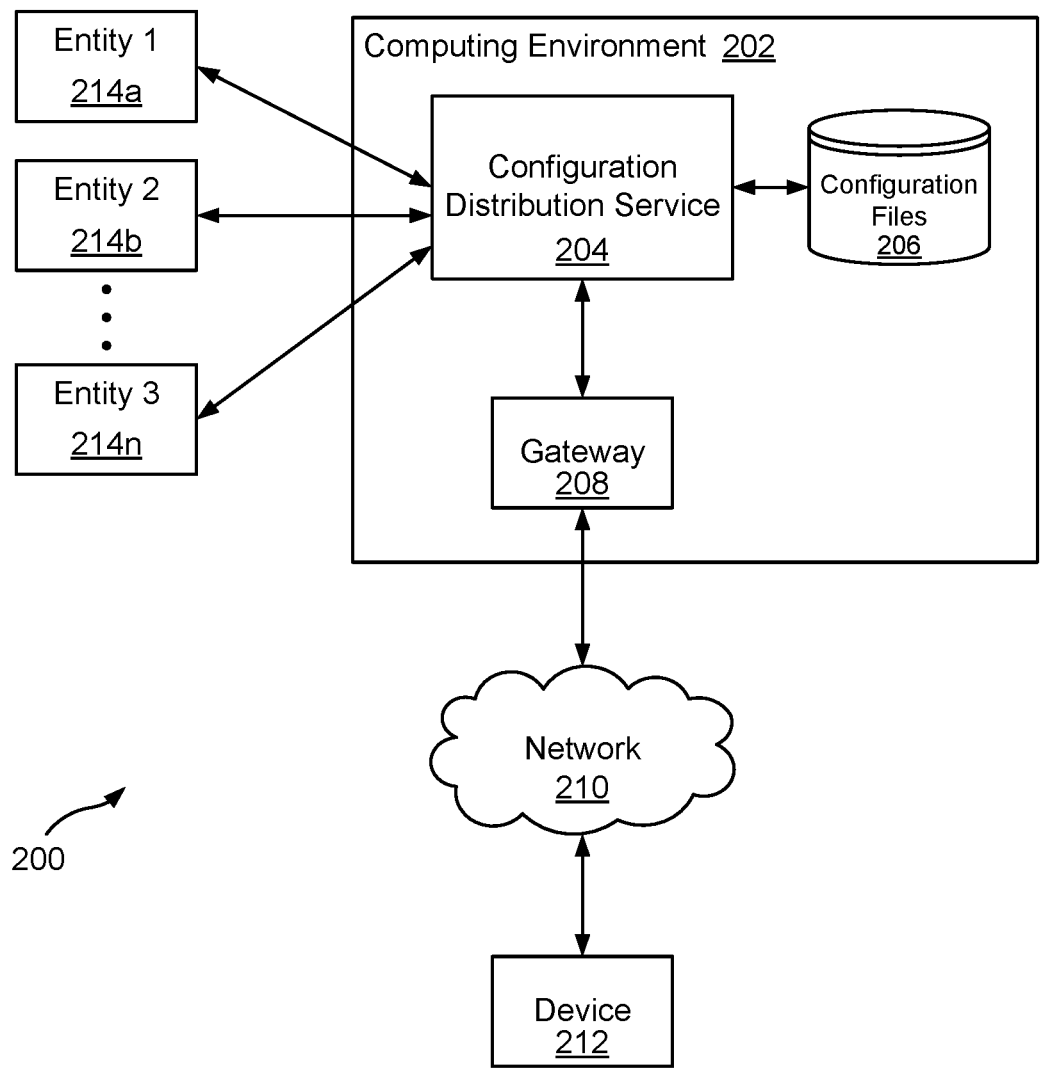
FIG. 2 is a block diagram that illustrates an example system for customizing a configuration file that may be distributed to a network addressable device using a configuration distribution service.

FIG. 2 is a block diagram that illustrates an example system 200 used to customize a configuration file 206 that may be distributed to a network addressable device 212 using a configuration distribution service 204. A common challenge for manufacturers of "smart" devices 212 and customers of the devices 212 is the economical configuration of the devices 212 when the devices 212 are installed. The system 200 may allow device manufacturers to simplify the configuration process by distributing a configuration file 206 for a device 212 using the configuration distribution service 204.

As illustrated, one or more entities 214a-n may be allowed to modify configuration settings included in a configuration file 206 prior to distributing the configuration file 206 to a device 212. The entities 214a-n may include a manufacturer, distributor, retailer, installer, customer, and the like. In one example, a manufacturer may create a configuration file 206 for a device 212 and store the configuration file 206 within the computing environment 202. After the purchase of a device 212, the manufacturer may customize configuration settings in the configuration file 206 according to the purchase. For instance, via the configuration distribution service 204, the manufacturer may customize the configuration file 206 according to the location of the purchase and/or a customer that purchased the device 212. The configuration file 206 may be encrypted using a manufacturer's cryptographic key and the configuration file 206 may be decrypted prior to the configuration file 206 being applied to a device 212 using a cryptographic key that was embedded in the device 212 at the time of manufacture or provided to the device 212 sometime prior to applying the configuration file 206 to the device 212.

In another example, a manufacturer may create a configuration file 206 for a device 212 that may be stored within the computing environment 202 and the manufacturer may specify configuration settings that may be configured by entities 214a-n other than the manufacturer. For example, a first entity 214a (e.g., a regional distributor) may be allowed to modify regional settings and a second entity 214b (e.g., a retailer) may be allowed to modify customer settings included in the configuration file 206. An entity 214a-n that modifies a configuration setting accessible to the entity 214a-n may encrypt the configuration setting using the entity's own cryptographic key. As such, the integrity of a configuration setting modified by an entity 214a-n may be maintained by the entity 214a-n via the entity's cryptographic key. The configuration file 206 may be decrypted when the configuration file 206 is applied to a device 212 using a cryptographic key that was embedded in the device 212 at the time of manufacture or provided to the device 212 prior to applying the configuration file 206 to the device 212. Entities 214a-n may trust the entities' cryptographic keys to be stored, managed, and used within the computing environment 202 or may maintain the entities' cryptographic keys themselves.

A configuration file 206 that has been prepared for a device 212 may be distributed to the device 212 using the configuration distribution service 204. In one example, a device 212 may be installed (e.g., set-up) by establishing network connectivity (e.g., wired and/or wireless) with a network 210 that allows the device 212 to connect to the configuration distribution service 204 via a gateway 208. Establishing network connectivity may comprise manually entering network credentials for a network 210 into a device 212, or may comprise using the configuration distribution service 204 to transmit network credentials for the network 210 stored in the computing environment 202 to a secondary device (e.g., a short-range enabled device, RFID programmer, USB device, etc.) and transferring the network credentials from the secondary device to the device 212. Once network connectivity has been established, the device 212 may be configured to connect to the configuration distribution service 204 and obtain the configuration file 206.

As a specific example, a manufacturer of a network addressable device 212 may assign a device identifier and a cryptographic key to a device 212. After the device 212 is ordered, the manufacturer may ship the device 212 to a retailer and create a configuration file 206 for the device 212. For example, the manufacturer may utilize the configuration distribution service 204 to create the configuration file 206, or the manufacturer may create the configuration file 206 and upload the configuration file 206 to the computing environment 202. The configuration file 206 may include default settings provided and encrypted by the manufacturer and retail settings that the retailer may modify. For example, the manufacturer may specify in the configuration distribution service 204 that the retailer is authorized to provide configuration information that is independent of the configuration information provided by the manufacturer. After receiving the device 212, the retailer may provide configuration information for the device 212 via the configuration distribution service 204, which may be encrypted using the retailer's cryptographic key.

Having received the device 212, the retailer, an installer, or a customer installing the device 212 may power up the device 212 and establish network connectivity with a network 210 using one of the methods described above that allows the device 212 to communicate with the configuration distribution service 204. The device 212 may then request the encrypted configuration file 206 that includes the manufacturer's and the retailer's configuration information from the configuration distribution service 204 (e.g., using a device identifier) and decrypt the configuration file 206 using a cryptographic key embedded in the device 212 at the time of manufacture, or alternatively, delivered to the device 212 separately from the configuration file 206 via a secure communication channel. For example, the cryptographic key used to decrypt the configuration file 206 may be transmitted to the device using a secondary device (e.g., a short-range enabled device, RFID programmer, USB device, etc.) that transfers the cryptographic key from the secondary device to the device 212.

Figure 3:
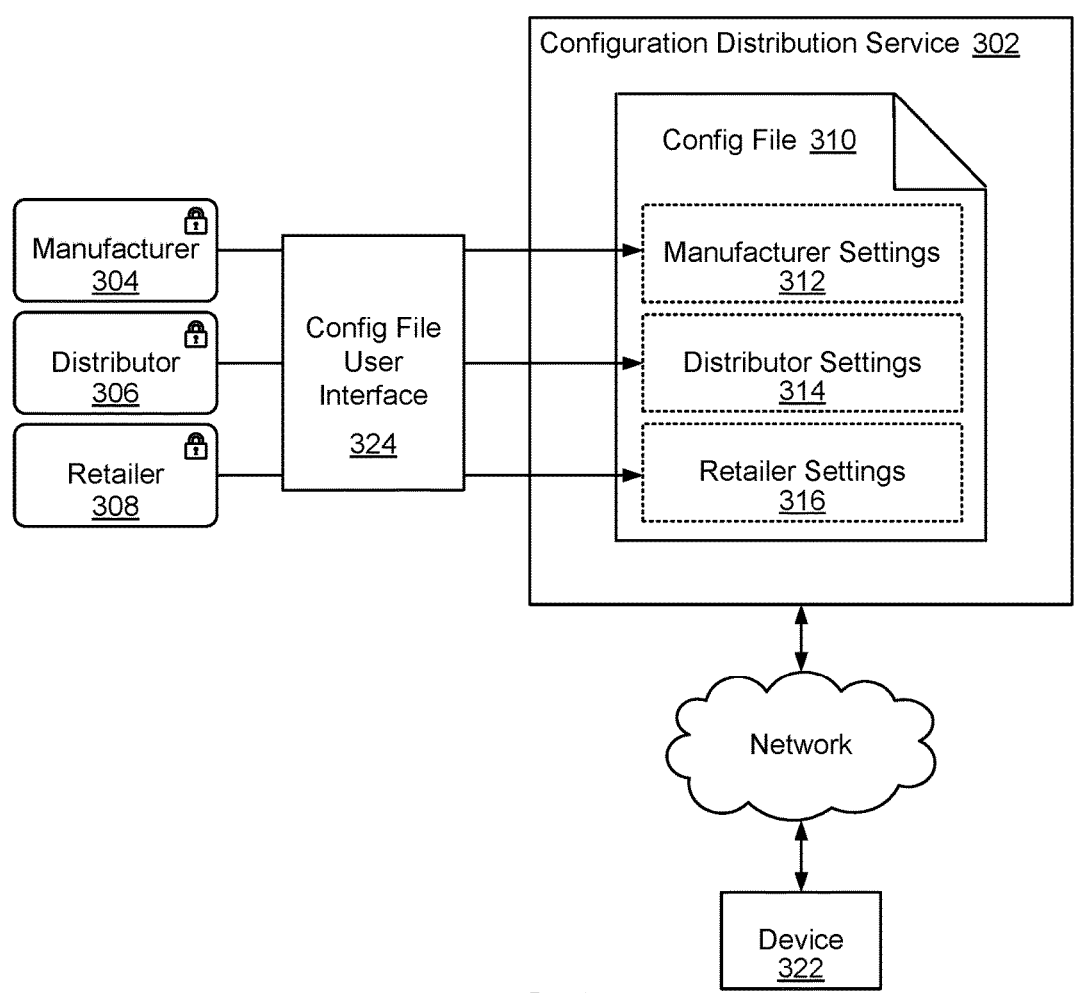
FIG. 3 is a block diagram that illustrates a system having configuration settings that may be accessible to various entities for customization.

FIG. 3 is a diagram illustrating an example configuration file 310 having configuration settings 312, 314, and 316 that are made accessible to various entities 304, 306, and 308 for customization. As illustrated, a configuration distribution service 302 may be used to manage a configuration file 310 that may be customized to a particular network addressable device 322. A configuration user interface 324 enables entities 304, 306, and 308 authorized to modify configuration settings 312, 314, and 316 to access the configuration file 310. For example, a manufacturer 304 of a device 322 may create a configuration file 310 and specify configuration settings that other entities are authorized to customize. For example, the manufacturer 304 may specify a distributor 306 and distributor settings 314 that the distributor 306 can customize, and specify a retailer 308 and retailer settings 316 that the retailer 308 can customize. The configuration distribution service 302 may be used to manage entity access to a configuration file 310.

In one example, an entity 304, 306, and 308 may use a cryptographic key to access and/or encrypt configuration settings 312, 314, and 316 assigned to the entity. A cryptographic key may be symmetric or asymmetric. In one example, a cryptographic key may be owned by an entity that may maintain the cryptographic key or allow the configuration distribution service 302 to maintain the cryptographic key on behalf of the entity. For example, a manufacturer 304 may use the manufacturer's key to encrypt manufacturer settings 312, a distributor 306 may use the distributor's key to encrypt the distributor settings 314, and a retailer 308 may use the retailer's key to encrypt the retailer settings 316. In another example, a computing service provider that hosts the configuration distribution service 302 may own and manage one or more cryptographic keys used to encrypt a configuration file 310. While FIG. 3 illustrates the configuration file 310 being accessed by the entities 304, 306, and 308 while the configuration file 310 is located within the configuration distribution service 302, the configuration file 310 may be modified using the encryption keys after the configuration distribution service has sent the configuration file to another entity (e.g., a distributor) for loading into the device 322.

Figure 4:
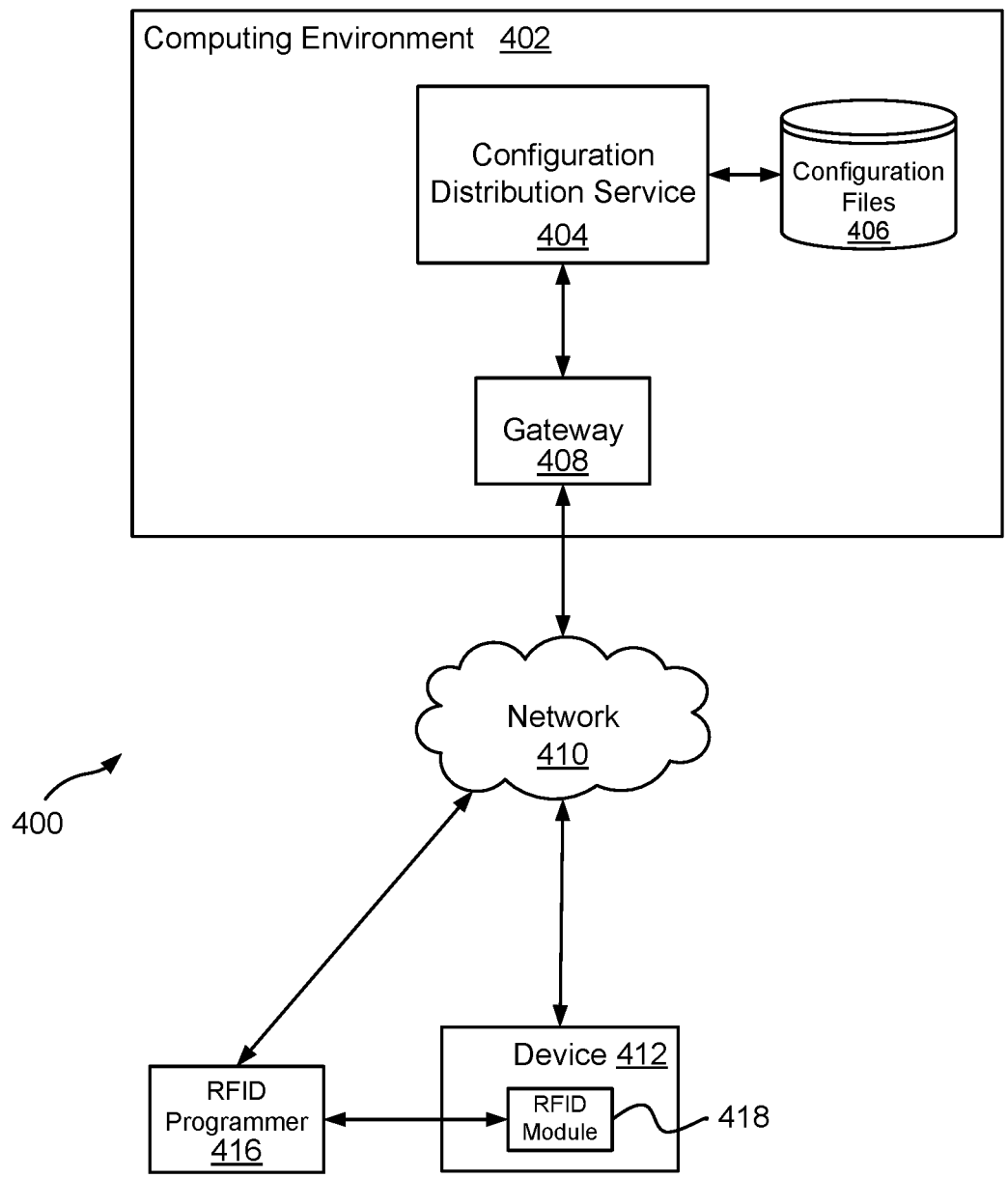
FIG. 4 is a block diagram that illustrates an example system for distributing a configuration file to a network addressable device having an integrated RFID module.

FIG. 4 is a block diagram that illustrates an example system 400 for distributing an encrypted configuration file 406 having customized configuration settings to a network addressable device 412 that has a type of integrated passive receiving device with writable memory, namely an RFID module 418. In one example configuration, a device 412 may be manufactured to include an RFID module 418 that has writable memory (e.g., a read-write chip) that is readable by a processor of the device 412. RFID is a wireless technology that uses electromagnetic fields to transfer data between an RFID module 418 (e.g., RFID tag) and a RFID reader or programmer. The RFID module 418 may be integrated into a circuit board of the device 412 such that information written to the RFID module 418 may be read using a device 412 processor. For example, a RFID programmer 416 may read and write information on an RFID module 418 integrated into a device 412 circuit board via electromagnetic fields and a device 412 processor may read the information on the RFID module 418 via a bus system on the circuit board.

In the example illustrated, a customized configuration file 406 may be provided to a device 412 with an integrated RFID module 418 using a configuration distribution service 404 that sends the configuration file 406 to an RFID programmer 416 in response to a request for the configuration file 406. In one example, a request for a configuration file may be made via an API (Application Programming Interface) for the configuration distribution service 404. Illustratively, the API may be a Representational state transfer (REST) technology or Simple Object Access Protocol (SOAP) technology. The configuration file 406 may then be transmitted from the RFID programmer 416 to the RFID module 418 in the device 412.

For example, the RFID programmer 416 may establish a network connection with the configuration distribution service 404 via a gateway 408 and request a configuration file 406 by providing an identifier (e.g., a device identifier, account identifier, order number, etc.) associated with a configuration file 406 to the configuration distribution service 404. The configuration distribution service 404 may identify a configuration file 406 associated with the identifier and send the configuration file to the RFID programmer 416. The RFID programmer 416 may then be used to write the configuration file 406 to the RFID module 418 integrated in the device 412. In one example, an RFID programmer 416 may be a Near Field Communication (NFC) enabled device (e.g., mobile device) that includes a wireless network radio that enables the device to download a configuration file 406 from the computing environment 402 via the Internet and use NFC reader/writer mode to write the configuration file 406 to the RFID module 418 in the device 412. In another configuration, near field magnetic induction (NFMI) signals may be used for communicating the configuration file 406 to a near field magnetic induction device.

Having written the configuration file 406 to the RFID module 418 in the device 412, the configuration file 406 may be applied to the configuration settings of the device 412 after powering on the device 412. For example, after powering on the device 412, the device 412 may be configured to obtain the configuration file 406 from the RFID module 418 and decrypt the configuration file 406 using a cryptographic key embedded in the device 412 at the time of manufacture, or provided to the device 412 separately from the configuration file 406. The configuration file 406 may then be applied to the configuration settings of the device 412. Illustratively, network credentials for a network 410 may be included in the configuration file 406, such that when the configuration file 406 is applied to the configuration settings of the device 412, the device 412 may establish a network connection with the computing environment 402 that allows the device to communicate with available services included in the computing environment 402.

As an illustrative use case, an electronic retailer may contract with a device manufacturer to make devices 412 for sale via the electronic retailer's electronic store. At the time of manufacture, the devices 412 may be programmed with a serial number (e.g., an RFID identifier) and a private cryptographic key. The devices 412 may be shipped to various distribution centers for storage until the devices 412 are ordered. Upon the ordering of a device 412 by a customer, using the configuration distribution service 404, the electronic retailer may create a custom configuration file 406 for the customer's device 412. The configuration file 406 may include the customer's wireless network identifier (Service Set Identifier (SSID)), network password, electronic retailer account details, language preference, locality preference, as well as other information. The configuration file 406 may then be encrypted using a public cryptographic key.

The order for the device 412 may be received at a distribution center where a distribution center associate or virtual agent (e.g., a scanner on a shipping conveyer line) uses an RFID programmer 416 to obtain the serial number of the device 412 from the device 412 and transmit the serial number to the configuration distribution service 404. In one example, at the time that the device 412 was ordered, the serial number of a device 412 may have been associated with the configuration file 406 and the serial number may be used to identify the configuration file 406. In another example, an identifier, such as a customer account identifier or customer order number associated with the configuration file 406 may be transmitted from the RFID programmer 416 to the configuration distribution service 404 and used to identify the configuration file 406. The configuration distribution service 404 may identify the configuration file 406 for the device 412 and send the configuration file 406 to the RFID programmer 416. The RFID programmer 416 may then be used to write the configuration file 406 to the RFID module 418 included in the device 412. The device 412 may then be shipped to the customer. When the customer receives and powers on the device 412, the device 412 may be configured to retrieve the configuration file 406 from the RFID module 418, decrypt the configuration file 406 using the device's private cryptographic key, and apply the configuration file 406 to the configuration settings of the device 412. The device 412 then establishes a connection to the customer's network and the network services included in the computing environment 402.

Figure 5:
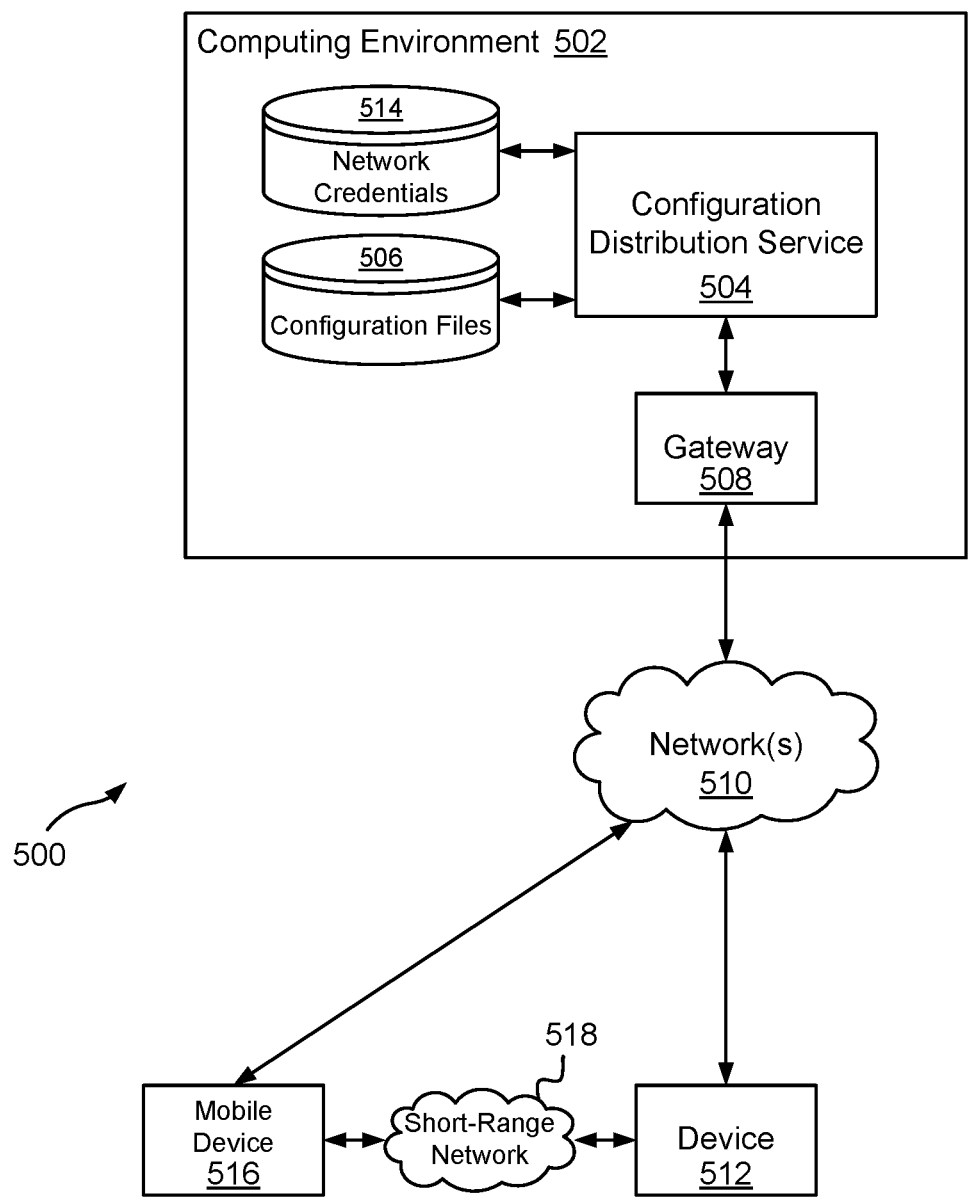
FIG. 5 is a block diagram that illustrates an example system for distributing a configuration file to a network addressable device using a short-range network.

FIG. 5 is a block diagram illustrating an example system 500 for distributing an encrypted configuration file 506 having customized configuration settings to a network addressable device 512. In particular, the system 500 includes a mobile device 516 that, in one example, may be used to provide network credentials 514 to a device 512 that uses the network credentials 514 to connect to a network 510 and obtain a configuration file 506 from a configuration distribution service 504. A mobile device 516 may be a short-range network enabled device capable of transmitting data using an electromagnetic transmitter over a short-range network, such as, but not limited to, BLUETOOTH, ZIG-BEE, WI-FI DIRECT, or infrared transmission (Infrared (IR) light).

As illustrated, encrypted network credentials 514 for a network 510 may be stored in a computing environment 502. Illustratively, the network credentials 514 may include a wireless network SSID and network password for a customer network. A mobile device 516 may be used to obtain the network credentials 514 for the network 510 prior to, or during installation of the device 512. For example, a customer may entrust the customer's network credentials 514 to the computing environment 502. Using an identifier, such as a customer account identifier, the mobile device 516 may be used to request the network credentials 514 from the configuration distribution service 504. In one example, the request may be made using an API for the configuration distribution service 504. As a specific example, a person installing a device 512 may use a mobile device 516 to connect to the Internet and obtain the network credentials 514 from the computing environment 502 using a customer account identifier.

After powering on a device 512 for a first time (e.g., during installation of the device 512), the device 512 may be configured to establish communication between the mobile device 516 and the device 512 using a short-range network 518. For example, upon powering the device 512, a BLUETOOTH radio may be turned on and the mobile device 516 may be paired with the device 512 and the encrypted network credentials 514 obtained from the computing environment 502 and stored in memory of the mobile device 516 may be transferred to the device 512 via a BLUETOOTH network connection. The device 512 may be configured to decrypt the network credentials 514 using an embedded cryptographic key and use the network credentials 514 to establish a connection to the network 510 and obtain a configuration file 506 for the device 512 via the configuration distribution service 504, as well as connect to services included in the computing environment 502 via a gateway 508.

In an alternative example, the mobile device 516 may be used to provide an encrypted configuration file 506 to a device 512, as opposed to providing just the network credentials 514 to the device 512 as described above. For example, a person installing a device 512 may use a mobile device 516 to connect to the Internet and obtain an encrypted configuration file 506 for the device 512 by submitting a device identifier, customer account identifier, order number, etc. to the configuration distribution service 504. In response, the configuration distribution service 504 may identify the configuration file 506 and send the configuration file 506 to the mobile device 516, which may then transmit the configuration file 506 to the device via a short-range network 518.

Figure 6:
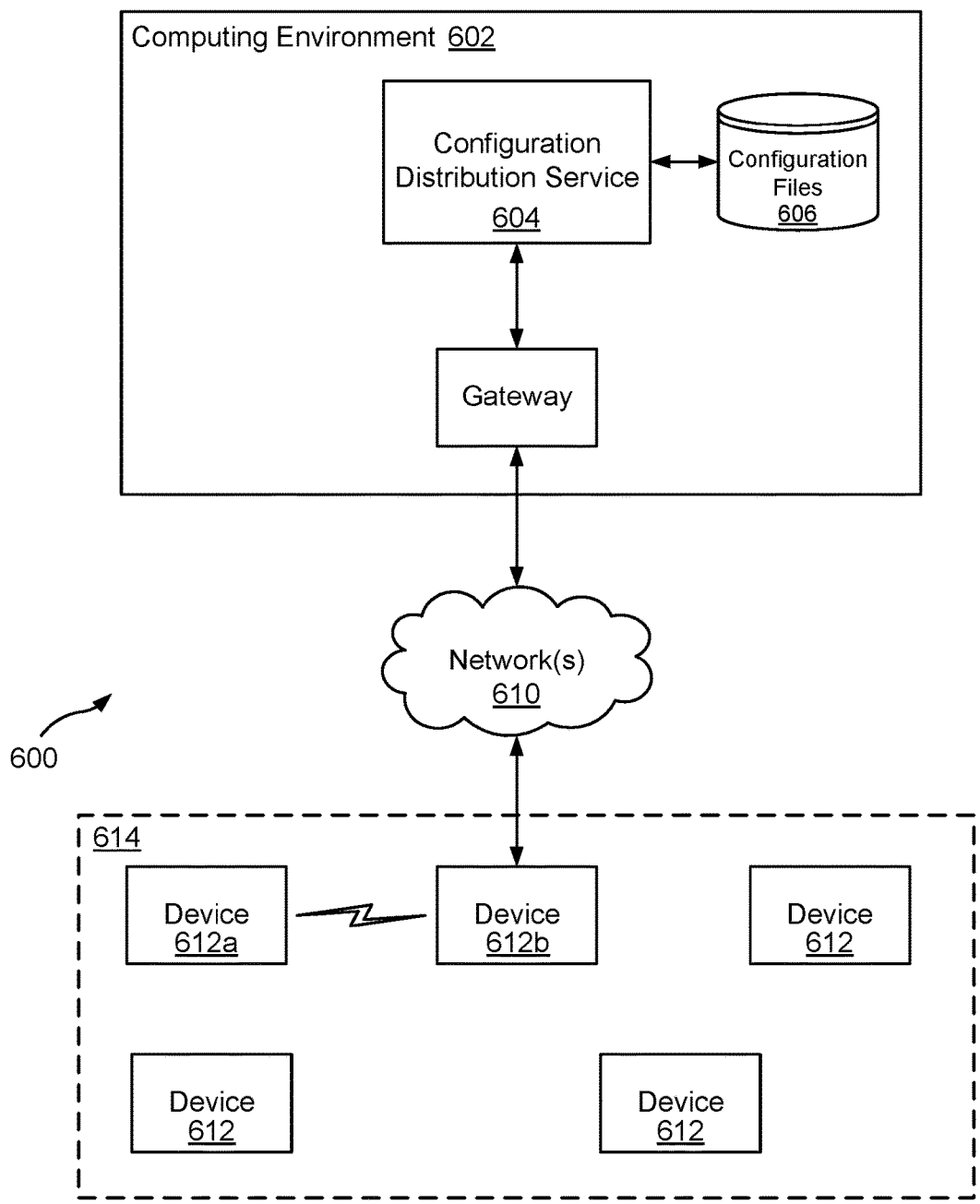
FIG. 6 is a block diagram illustrating an example system for distributing a configuration file to a network addressable device that obtains network credentials from a nearby device.

FIG. 6 is a block diagram illustrating an example system 600 for distributing a configuration file 606 having customized configuration settings to a network addressable device 612b that obtains network credentials from a nearby device 612a. In one example, a device 612b may be configured to include a short-range network radio that may be activated when the device 612b is powered on. The device 612b may then search for a nearby device 612a that can provide the device 612b with network credentials that allows the device 612b to establish a connection to a network 610 and obtain a configuration file 606 from a computing environment 602.

As an illustration, a device 612b may be installed within an environment 614 that includes a plurality of devices 612a and 612 that may be capable of communicating with one another via a short-range network (e.g., BLUETOOTH, mesh network, etc.). After powering on the device 612b, the device's short-range network radio may be activated and the device 612b may search for a nearby device 612a (e.g., a device of the same make and model of the device 612b). After identifying a nearby device 612a, the device 612b may request network credentials used to connect to a network 610 that provides access to a computing environment 602. In requesting the network credentials from the device 612a, the device 612b may provide trust credentials to the device 612a that may be used to verify that the device 612b is authorized to request the network credentials. After verifying the trust credentials, the nearby device 612a may provide the network credentials to the device 612b, whereupon the device 612b may establish a connection to the network 610 and obtain a configuration file 606 for the device 612b via the configuration distribution service 604.

Alternatively, or in addition to obtaining network credentials from the nearby device 612a, the device 612b may obtain one or more configuration settings from the nearby device 612a. For example, many or all of the configuration settings that may be included in a configuration file 606 may be shared between devices within the same environment 614. As such, a device 612b that may be added to the environment 614 may obtain configuration settings from another device 612a that may already be operating within the environment 614 and apply the configuration settings to the device 612b.

Figure 7:
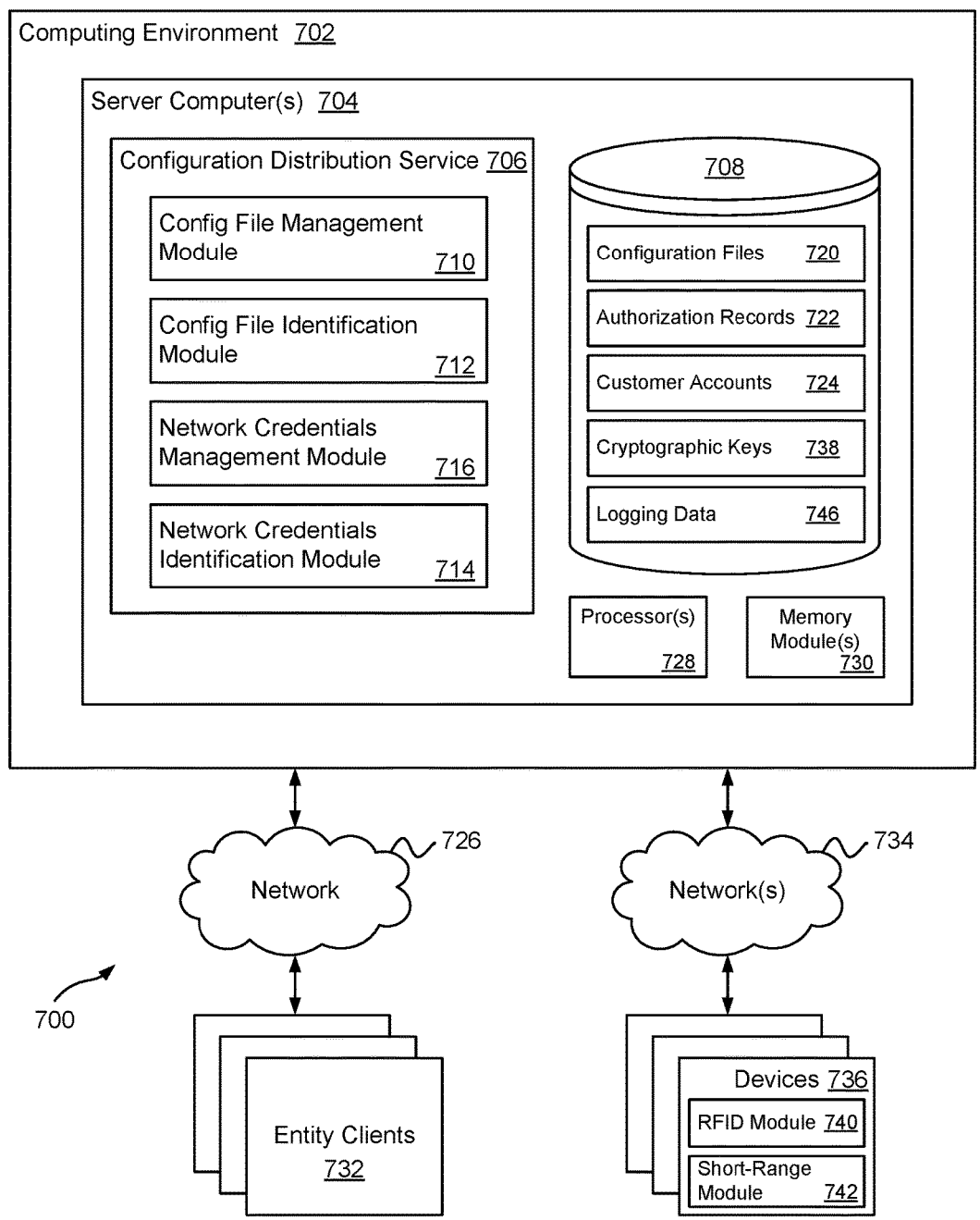
FIG. 7 is a block diagram that illustrates an example system having various example components included in a system for distributing a configuration file to a network addressable device.

Moving now to FIG. 7, a block diagram illustrates components of an example system 700 on which the present technology may be executed. The system 700 may include a server computer 704 that operates within a computing environment 702 that may be accessible to a plurality of network addressable devices 736 and entity clients 732 associated with the devices 736. The server computer 704 may execute a configuration distribution service 706 that includes a number of modules used to distribute configuration files 720 to the devices 736. For example, the configuration distribution service 706 may include: a configuration file management module 710, a configuration file identification module 712, a network credentials management module 716, and a network credentials identification module 714.

The configuration file management module 710 may be used to manage various aspects of hosting configuration files 720 in the computing environment 702. The configuration file management module 710 may be accessible to entity clients 732 via a user interface. Entities, such as device manufacturers, suppliers, distributors, retailers, and the like may use the configuration file management module 710 to create configuration files 720, upload configuration files 720 to the computing environment 702, and to create and manage authorization records 722 specifying those entities and configuration settings that the entities are authorized to modify. For example, a device manufacturer may submit authorization specifications that identify a customizable configuration setting included in a configuration file 720 and any entities that are authorized to modify the customizable configuration setting. In one example, actions performed in association with configuration files 720 may be recorded by the configuration file management module 710 and logging data 746 may be stored in the computing environment 702.

Also, entities may use the configuration file management module 710 to manage cryptographic keys 738 stored in the computing environment 702 that are used by the entities to encrypt configuration settings included in a configuration file 720. The configuration file management module 710 may be used to update cryptographic keys 738 and support cryptographic key rotation practices.

In one example, an entity via an entity client 732 or via an automated ordering system may use the configuration file management module 710 to create or modify a configuration file 720 for a device 736 in response to an order of the device 736. For example, the configuration file management module 710 may be used to customize a configuration file 720 to a customer that ordered the device 736. For instance, the configuration file management module 710 may be used to identify a customer account 724 associated with the order and obtain customer information from the customer account 724. The customer information may be used to populate various configuration settings in the configuration file 720. For example, network settings may be set using customer network credentials for the customer's wireless network that are included in the customer account 724 and owner settings, location settings, and language settings may be set using customer details obtained from the customer account 724. The customized configuration file 720 may be stored in the computing environment 702 in anticipation of a request for the configuration file 720.

The configuration file identification module 712 may be configured to identify a configuration file 720 stored in a data store 708 in response to a request for the configuration file 720. For example, a request from a device 736 or an intermediary device for a configuration file 720 may include an identifier that corresponds with a configuration file 720 stored in the computing environment 702. Illustratively, the identifier may be a device identifier (e.g., a serial number), a customer account 724, an order number, or some other type of identifier that has been associated with a configuration file 720 for a device 736. As an illustration, at the time that a configuration file 720 for a device 736 is created or customized in response to a customer order of the device 736, the configuration file 720 may be associated with a device serial number, customer account 724, order number, or other type of identifier. A request for the configuration file 720 may include the identifier associated with the configuration file 720 and the configuration file 720 may be identified in the data store 708 using the identifier and returned to the requester.

The network credentials management module 716 may be configured to manage network credentials for a customer's network. A customer network may be a network that is connected to the Internet. The customer network may be a wireless network, cellular network, satellite network, a virtual network, or the like. Customer network credentials may be included in a customer account 724. The network credentials management module 716 may enable a customer to manage (e.g., add, modify, or delete) network credentials included in a customer account 724.

The network credentials identification module 714 may be configured to identify a customer's network credentials that may be included in a customer account 724 in response to a request for the customer network credentials. For example, customer network credentials may be requested during installation of a device 736 where the customer network credentials are transmitted to an intermediary device (e.g., a mobile device) that provides the customer network credentials to the device 736 via a RFID module 740 or short-range network module 742, thereby enabling the device 736 to connect to a network 734 and obtain a configuration file 720 from the configuration distribution service 706. A request for customer network credentials may include a customer account identifier (e.g., account number) that may be used to identify a customer account 724 in a data store that includes the customer network credentials.

An entity may utilize a client 732 to access and modify a configuration file 720. A client 732 may include any device capable of sending and receiving data over a network 726. A client 732 may comprise, for example a processor-based system such as a computing device. A client 732 may be a device such as, but not limited to, a desktop computer, laptop or notebook computer, tablet computer, mainframe computer system, handheld computer, workstation, network computer, or other devices with like capability.

The various processes and/or other functionality contained within the system 700 may be executed on one or more processors 728 that are in communication with one or more memory modules 730. The system 700 may include a number of computing devices that are arranged, for example, in one or more server banks or computer banks or other arrangements. The computing devices may support a computing environment using hypervisors, virtual machine monitors (VMMs) and other virtualization software.

A data store 708 may store configuration files 720, authorization records 722, customer accounts 724, cryptographic keys 738, logging data 746, and other data. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The networks 726 and 734 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 7 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 7 illustrates an example of a system that may implement the techniques above, many other similar or different environments are possible. The example environments discussed and illustrated above are merely representative and not limiting.

FIG. 8 is a diagram illustrating an example computing environment 810 with which network addressable devices 830 may communicate. The computing environment 810, which may be referred to as a device communication environment or system, comprises various resources that are made accessible via gateway server 840 to the devices 830 that access the gateway server 840 via a network 820. The devices 830 may access the computing environment 810 in order to access services such as data storage and computing processing features. Services operating in the computing environment 810 may communicate data and messages to the devices 830 in response to requests from devices and/or in response to computing operations within the services.

The computing environment 810 comprises communicatively coupled component systems 840, 842, 846, 850 and 870 that operate to provide services to the devices 830. The gateway server 840 may be programmed to provide an interface between the devices 830 and the computing environment 810. The gateway server 840 receives requests from the devices 830 and forwards corresponding data and messages to the appropriate systems within the computing environment 810. Likewise, when systems within the computing environment 810 attempt to communicate data instructions to the devices 830, the gateway server 840 routes those requests to the correct device 830.

The gateway server 840 may be adapted to communicate with varied devices 830 using various different computing and communication capabilities. For example, the gateway server 840 may be adapted to communicate using either TCP (Transmission Control Protocol) or UDP (User Datagram Protocol) protocols. Likewise, the gateway server 840 may be programmed to receive and communicate with the devices 830 using any suitable protocol including, for example, MQTT (Message Queue Telemetry Transport), CoAP (Constrained Application Protocol), HTTP (Hyper Text Transport Protocol), and HTTPS (Hyper Text Transport Protocol Secure). The gateway server 840 may be programmed to convert the data and instructions or messages received from the devices 830 into a format that may be used by other of the server systems comprised in the computing environment 810. In one example, the gateway server 840 may be adapted to convert a message received using the HTTPS protocol into a JSON (JavaScript Object Notation) formatted message that is suitable for communication to other servers within the computing environment 810.

The gateway server 840 may store, or may control the storing, of information regarding the devices 830 that have formed a connection to the particular gateway server 840 and for which the particular gateway server 840 may be generally relied upon for communications with the device 830. In one example, the gateway server 840 may have stored thereon information specifying the particular device 830 such as a device identifier. For each connection established from the particular device 830, the gateway server 840 may also maintain information identifying the connection. For example, a connection identifier may be generated and stored for each connection established with a particular device 830. Information relating to the particular connection may also be stored. For example, information identifying the particular socket of the gateway server 840 on which the connection was established, as well as information identifying the particular protocol used by the device 830 on the connection may be stored by the gateway server 840. Information such as the socket and protocol may be used in order to facilitate further communications via the particular connection.

In one example, the gateway server 840 may communicate via any suitable networking technology with a device registry server 842. The device registry server 842 may be adapted to track the attributes and capabilities of each device 830. In an example, the device registry sever 842 may be provisioned with information specifying the attributes of the devices 830. In one example, the device registry server 842 comprises data specifying rules or logic for handling the various requests that may be received from the devices 830. The device registry server 842 may be programmed to convert specialized device functions or commands received in particular communication protocols such as, for example HTTPS, MQTT, CoAP, into functions or commands using particular protocols that are understood by other of the servers in the computing environment 810. In one example, the device registry server 842 may be provisioned with information specifying that upon receipt of a particular request from a particular device 830, a request should be made to store the payload data of the request in a particular network service server 850. The device registry server 842 may be similarly programmed to receive requests from servers 842, 850 and convert those requests into commands and protocols understood by the devices 830.

The device security server 846 maintains security-related information for the devices 830 that connect to the computing environment 810. In one example, the device security server 846 may be programmed to process requests to register devices with the computing environment 810. For example, entities such as device manufacturers, may forward requests to register devices 830 with the computing environment 810. The device security server 846 receives registration requests and assigns unique device identifiers to devices 830 which use the device identifiers on subsequent requests to access the computing environment 810. The device security server 846 stores, for each registered device, authentication information that may be provided during the device registration process. For example, a request to register a device 830 may comprise information identifying the device 830 such as a device serial number and information for use in authenticating the device 830. In one example, the information may comprise a digital certificate and may comprise a public key of a public key-private key pair. The information may be stored in relation to the assigned device identifier for the particular device 830. When the device 830 subsequently attempts to access the computing environment 810, the request may be routed to the device security server 846 for evaluation. The device security server 846 determines whether authentication information provided in the request is consistent with the authentication information stored in relation to the device identifier and provided during the registration process.

The device security server 846 may be further programmed to process request to associate particular entities (individuals or organizations) with particular devices 830. The device security server 846 may be adapted to receive requests to register entities, which may be, for example, individuals, users, accounts, and/or organizations, as authorized to control or communicate with a particular device 830. In one example, a request may be received from an individual or organization that may have purchased a device 830 from a manufacturer. For example, the device may be a dishwasher, thermostat, or lighting assembly that an individual or organization purchased from the manufacturer. The individual or organization may initiate a request to register the device 830 with the individual or an organization with which the organization is associated. The request may be routed to a web services server which may be comprised in computing environment 810 or which communicates the request to the computing environment 810. The request identifies the device 830 and the particular entity (individual or organization) that is requesting to be associated with the device 830. In one example, the request may comprise a unique device identifier that was assigned when the device 830 was registered with the system. The request further may comprise information uniquely identifying the entity that is registering as having authority to communicate with and/or control the particular device 830.

The device security server 846 stores the information identifying the particular entity in relation with the device identifier. When the particular entity subsequently attempts to control or communicate data to the particular device 830, the device security server 846 may use the information to confirm that the particular entity is authorized to communicate with or control the particular device 830. When an entity that has not been registered as being authorized to communicate with the device 830 attempts to communicate with or control the device 830, the device security server 846 may use the information stored in the device security server 846 to deny the request. The configuration distribution service 870 may be configured to distribute configuration files to the devices 830 as described earlier.

A network services server 850 may be any resource or processing server that may be used by any of servers 840, 842, 846, or 870 in processing requests from the devices 830. In one example, network services server 850 may provide data storage and retrieval services and/or on-demand processing capacity. In an example scenario, the network services server 850 may be any of numerous network accessible services including, for example, web or cloud-based services. In one example, web services server 850 may be programmed to provide particular processing for particular devices 830 and/or groups of devices 830. For example, a network services server 850 may be provisioned with software that coordinates the operation of a particular set of devices 830 that control a particular manufacturing operation.

Servers 840, 842, 846, 850, and 870 may be communicatively coupled via any suitable networking hardware and software. For example, the servers may communicate via a local area network or wide area network.

An external system 860 may access computing environment 810 for any number of purposes. In one example, an external system 860 may be a system adapted to forward requests to register devices 830 with the computing environment 810. For example, an external system 860 may be a server operated by or for a device manufacturer that sends requests to computing environment 810, and device security server 846 in particular, to register devices 830 for operation with computing environment 810. Similarly, the external system 860 may be a system operated to provide a gateway for entities (individuals or organizations) to register an ownership or control relationship with a particular device 830. For example, the external system 860 may be a system operated by or for a device manufacturer that registers a device 830 and a configuration file for the device 830 with the configuration distribution service server 870.

The devices 830 may be any devices that may be communicatively coupled via a network 820 with the computing environment 810. For example, the devices 830 may be computing devices such as smart phones and tablet computers, automobiles, appliances such as washers and driers, industrial sensors, switches, control systems, etc. In one example, each of devices 830 may communicate over the network 820 to store data reflecting the operations of the particular device 830 and/or to request processing provided by, for example, network services server 850. While FIG. 8 depicts three devices 830, it will be appreciated that any number of devices 830 may access the computing environment 810 via the gateway server 840. Further it will be appreciated that the devices 830 may employ various different communication protocols. For example, some devices 830 may transport data using TCP, while others may communicate data using UDP. Some devices 830 may use MQTT, while others may use CoAP, and still others may use HTTPs. It will also be appreciated that each of devices 830 may be programmed to send and receive particular functions or commands in its requests that are not compatible with other devices or even the systems within computing environment 810. The gateway server 840 may be programmed to receive and, if needed, attend to converting such requests for processing with the computing environment 810.

Figure 9:
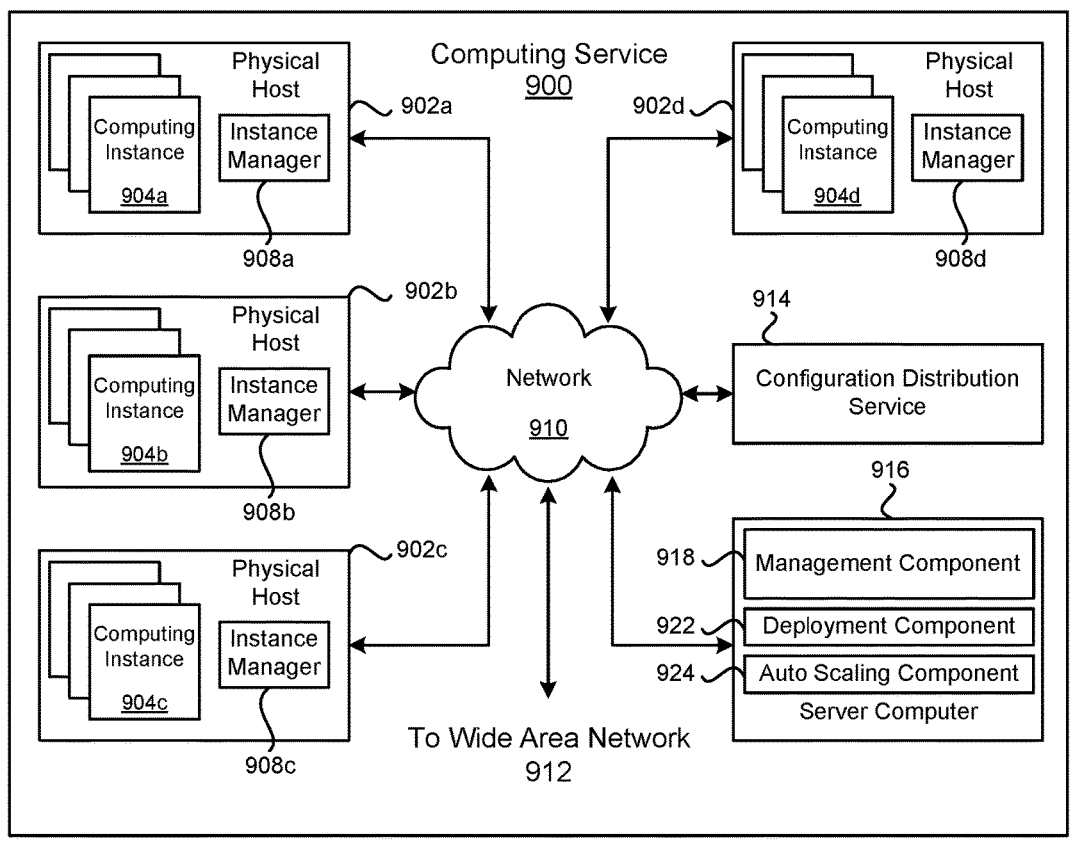
FIG. 9 is a block diagram illustrating an example computing service that may be used to execute and manage a number of computing instances that provide network services to network addressable devices.

FIG. 9 is a block diagram illustrating an example computing service 900 that may be used to execute and manage a number of computing instances 904a-d. In particular, the computing service 900 depicted illustrates one environment in which the technology described herein may be used. The computing service 900 may be one type of environment that includes various virtualized service resources that may be used, for instance, to host computing instances 904a-d that execute the services described in association with FIG. 8.

The particularly illustrated computing service 900 may include a plurality of server computers 902a-d. While four server computers are shown, any number may be used, and large data centers may include thousands of server computers. The computing service 900 may provide computing resources for executing computing instances 904a-d. Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine monitor (VMM), or another type of program configured to enable the execution of multiple computing instances 904a-d on a single server. Additionally, each of the computing instances 904a-d may be configured to execute one or more applications.

One or more server computers 914 and 916 may be reserved to execute software components for managing the operation of the computing service 900 and the computing instances 904a-d. For example, the server computer 914 may execute a configuration distribution service as described earlier. The server computer 916 may execute a management component 918, a deployment component 922, and an auto scaling component 924.

An entity may access the management component 918 to configure various aspects of the operation of the computing instances 904a-d purchased by the entity. For example, an entity may setup computing instances 904a-d and make changes to the configuration of the computing instances 904a-d. The deployment component may assist entities in the deployment of new instances of computer resources.

The deployment component may receive a configuration from an entity that includes data describing how new computing instances 904a-d should be configured. For example, the configuration may specify one or more applications that should be installed in new computing instances 904a-d, provide scripts and/or other types of code to be executed for configuring new computing instances 904a-d, provide cache warming logic specifying how an application cache should be prepared, and other types of information. The deployment component may utilize the entity-provided configuration and cache warming logic to configure, prime, and launch new computing instances 904a-d. The configuration, cache warming logic, and other information may be specified by an entity using the management component or by providing this information directly to the deployment component. Other mechanisms may also be utilized to configure the operation of deployment component.

The auto scaling component may scale computing instances 904a-d based upon rules defined by an entity of a web services platform. For example, the auto scaling component may allow an entity to specify scale up rules for use in determining when new computing instances 904a-d should be instantiated and scale down rules for use in determining when existing computing instances 904a-d should be terminated.

A network 910 may be utilized to interconnect the computing service 900 and the server computers 902a-d, 916. The network 910 may be a local area network (LAN) and may be connected to a Wide Area Network (WAN) 912 or the Internet. The network topology illustrated in FIG. 9 has been simplified, many more networks and networking devices may be utilized to interconnect the various computing systems disclosed herein.

Figure 10:
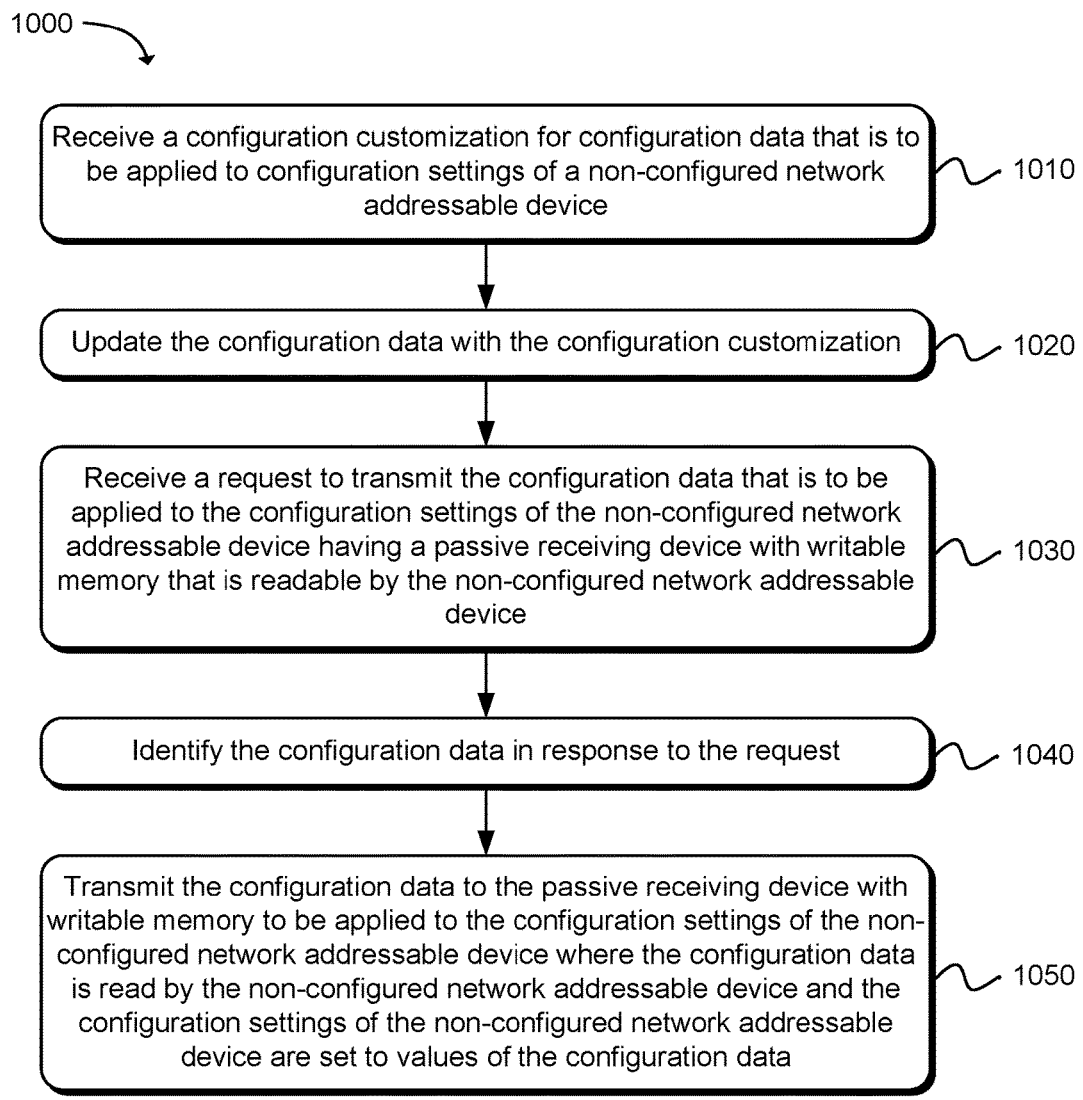
FIG. 10 is a flow diagram illustrating an example method for distributing a configuration file to a network addressable device.

FIG. 10 is a flow diagram illustrating an example method 1000 for distributing configuration data having configuration customizations to a non-configured network addressable device. Starting in block 1010, a configuration distribution service may receive a configuration customization for configuration data that is to be applied to the configuration settings of a non-configured network addressable device. For example, the configuration customization may be received from an entity authorized to modify at least one customizable configuration setting included in the configuration data. A determination may then be made whether the entity is authorized to modify the customizable configuration setting and the customizable configuration setting may be updated with the configuration setting received from the authorized entity.

As in block 1020, the configuration data may be updated with the configuration customization. In one example, configuration settings may be encrypted using a cryptographic key. For example, manufacturer configuration settings included in a configuration data may be encrypted using a manufacturer's cryptographic key and authorized entity configuration settings included in the configuration data may be encrypted using an entity's cryptographic key.

As in block 1030, a request to transmit the configuration data that is to be applied to the configuration settings of the non-configured network addressable device having a passive receiving device with writable memory that is readable by the non-configured network addressable device may be received at the configuration distribution service. In one example, the request for the configuration data may be sent by the non-configured network addressable device that is configured to establish a network connection with the configuration distribution service after being powered on. In another example, the request for the configuration data may be sent by an intermediate device, such as a mobile device that may be used to transfer the configuration data to the non-configured network addressable device.

As in block 1040, the configuration data may be identified in response to the request (e.g., using an identifier for the non-configured network addressable device or a customer account identifier). As in block 1050, the configuration data may be transmitted to the passive receiving device with writable memory to be applied to the configuration settings of the non-configured network addressable device, or to an intermediate device that is then used to transmit the configuration data to the non-configured network addressable device. The configuration data may then be decrypted and read by the non-configured network addressable device and the configuration settings of the non-configured network addressable device may be set to the values of the configuration data.

Figure 11:
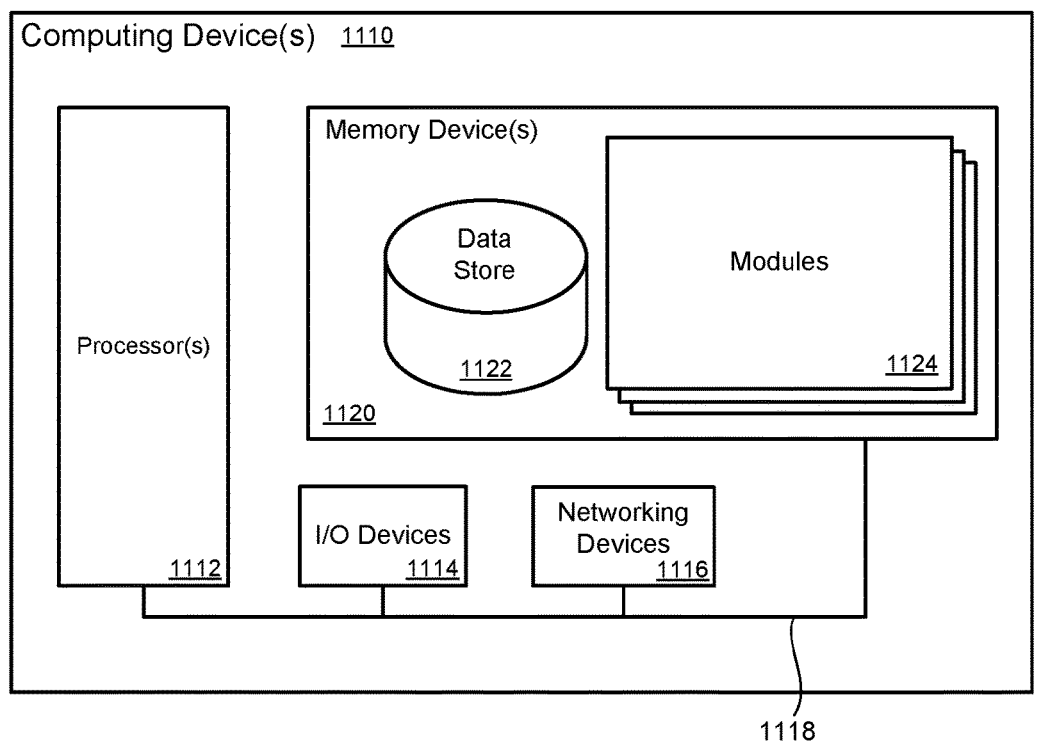
FIG. 11 is block diagram illustrating an example of a computing device that may be used to execute a method for distributing a configuration file to a network addressable device.

FIG. 11 illustrates a computing device 1110 on which modules of this technology may execute. A computing device 1110 is illustrated on which a high level example of the technology may be executed. The computing device 1110 may include one or more processors 1112 that are in communication with memory devices 1120. The computing device 1110 may include a local communication interface 1118 for the components in the computing device. For example, the local communication interface 1118 may be a local data bus and/or any related address or control busses as may be desired.

The memory device 1120 may contain modules 1124 that are executable by the processor(s) 1112 and data for the modules 1124. For example, the memory device 1120 may include a configuration distribution service that comprises a configuration file management module, a configuration file identification module, a network credentials identification module, a configuration file user interface module, and other modules. The modules 1124 may execute the functions described earlier. A data store 1122 may also be located in the memory device 1120 for storing data related to the modules 1124 and other applications along with an operating system that is executable by the processor(s) 1112.

Other applications may also be stored in the memory device 1120 and may be executable by the processor(s) 1112. Components or modules discussed in this description that may be implemented in the form of software using high programming level languages that are compiled, interpreted or executed using a hybrid of the methods.

The computing device may also have access to I/O (input/output) devices 1114 that are usable by the computing devices. Networking devices 1116 and similar communication devices may be included in the computing device. The networking devices 1116 may be wired or wireless networking devices that connect to the internet, a LAN, WAN, or other computing network.

The components or modules that are shown as being stored in the memory device 1120 may be executed by the processor(s) 1112. The term "executable" may mean a program file that is in a form that may be executed by a processor 1112. For example, a program in a higher level language may be compiled into machine code in a format that may be loaded into a random access portion of the memory device 1120 and executed by the processor 1112, or source code may be loaded by another executable program and interpreted to generate instructions in a random access portion of the memory to be executed by a processor. The executable program may be stored in any portion or component of the memory device 1120. For example, the memory device 1120 may be random access memory (RAM), read only memory (ROM), flash memory, a solid state drive, memory card, a hard drive, optical disk, floppy disk, magnetic tape, or any other memory components.

The processor 1112 may represent multiple processors and the memory device 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:
   receive a configuration file at a configuration distribution service which provides management of the configuration file on behalf of a first entity, wherein the configuration file is for installation on a non-configured network addressable device that includes a Radio Frequency Identification (RFID) module having writable memory that is readable by a device processor included in the non-configured network addressable device;
   receive authorization specifications from the first entity used to update an authorization record to allow a second entity included in a distribution chain of the non-configured network addressable device to modify a customizable configuration setting of the non-configured network addressable device;
   receive a configuration customization from the second entity;
   write the configuration customization to the configuration file, forming a customized configuration file;
   receive a device identifier for the non-configured network addressable device obtained from the RFID module integrated in the non-configured network addressable device;
   identify the customized configuration file for the non-configured network addressable device using the device identifier for the non-configured network addressable device;
   obtain customer account information associated with a purchaser of the non-configured network addressable device;
   add the customer account information to the customized configuration file; and
   send the customized configuration file to a RFID programmer that is used to write the customized configuration file to the writable memory of the RFID module when the device processor is unpowered, wherein the customized configuration file is applied to the non-configured network addressable device upon powering the non-configured network addressable device for set-up.

2. A non-transitory machine readable storage medium as in claim 1, wherein the instructions that when executed by the processor further include network connection credentials in the customized configuration file for a customer network that are used by the non-configured network addressable device to connect to the customer network as part of the set-up of the non-configured network addressable device.

3. A non-transitory machine readable storage medium as in claim 1, wherein the instructions that when executed by the processor further include access credentials in the customized configuration file for a network accessible service that are used by the non-configured network addressable device to connect to the network accessible service.

4. A non-transitory machine readable storage medium as in claim 1, wherein the instructions that when executed by the processor further encrypt the customized configuration file using a cryptography technique.

5. A computer implemented method, comprising:
   receiving at a configuration distribution service, via a network, configuration data from a first entity to be managed by the configuration distribution service hosted by a computing service provider;
   receiving at the configuration distribution service, via the network, authorization specifications from the first entity to update an authorization record to allow a second entity included in a distribution chain of a non-configured network addressable device to modify a customizable configuration setting of the non-configured network addressable device;
   receiving at the configuration distribution service, via the network, a configuration customization from the second entity;
   writing the configuration customization to the configuration data to be applied to the customizable configuration setting of the non-configured network addressable device;
   receiving at the configuration distribution service, via the network, a request to transmit the configuration data to be applied to configuration settings of the non-configured network addressable device having a passive receiving device with writable memory that is readable by the non-configured network addressable device; and
   transmitting by the configuration distribution service, via the network, the configuration data to the passive receiving device with writable memory to be applied to the configuration settings of the non-configured network addressable device, wherein the configuration settings of the non-configured network addressable device are configured to be set to values of the configuration data after the non-configured network addressable device is powered for set-up.

6. A method as in claim 5, wherein the first entity is a manufacturer of the non-configured network addressable device and the configuration distribution service manages the configuration data on behalf of the manufacturer.

7. A method as in claim 5, wherein receiving the configuration customization from the second entity further comprises:
   receiving a configuration setting value from the second entity authorized to modify a customizable configuration setting included in the configuration data;
   determining that the second entity is authorized to modify the customizable configuration setting; and updating the customizable configuration setting with the configuration setting value.

8. A method as in claim 5, further comprising encrypting a manufacturer configuration setting included in the configuration data using a manufacturer cryptographic key.

9. A method as in claim 5, further comprising encrypting a non-manufacturer configuration setting included in the configuration data that is associated with a non-manufacturer entity authorized to customize the configuration data using a non-manufacturer cryptographic key.

10. A method as in claim 5, wherein applying the configuration settings to the non-configured network addressable device comprises decrypting the configuration settings by the non-configured network addressable device using a cryptographic key assigned to the non-configured network addressable device.

11. A method as in claim 10, wherein the cryptographic key assigned to the non-configured network addressable device is stored on the non-configured network addressable device.

12. A method as in claim 10, wherein the cryptographic key assigned to the non-configured network addressable device is sent to the non-configured network addressable device separately from the configuration data.

13. A method as in claim 5, wherein receiving the request to transmit the configuration data to be applied to the configuration settings of the non-configured network addressable device further comprises:
   establishing a network connection with a passive receiving device programmer that is used to write the configuration data to the passive receiving device; and
   sending the configuration data to the passive receiving device programmer over the network.

14. A method as in claim 5, further comprising:
   receiving a device identifier for the non-configured network addressable device that is obtained from the passive receiving device using a passive receiving device programmer; and
   finding the configuration data using the device identifier.

15. A method as in claim 5, further comprising:
   obtaining customer account information from a customer account associated with a seller of the non-configured network addressable device; and
   including the customer account information in the configuration data, wherein the customer account information includes: customer network credentials, a customer location, customer language, or customer ID.

16. A system comprising:
   at least one processor;
   a memory device including instructions that, when executed by the at least one processor, cause the system to:
   create an encrypted configuration file that is to be applied to configuration settings of a non-configured network addressable device having an electromagnetic receiver, wherein the encrypted configuration file is managed by a configuration distribution service on behalf of a first entity, and a computing service provider hosts the configuration distribution service, wherein the configuration distribution service allows at least a second entity to access and modify the encrypted configuration file;
   receive authorization specifications from the first entity used to update an authorization record to allow the second entity included in a distribution chain of the non-configured network addressable device to modify a customizable configuration setting of the non-configured network addressable device;
   receive a configuration customization for the non-configured network addressable device from the second entity;
   update the encrypted configuration file with the configuration customization;
   receive a request to send the encrypted configuration file; and
   transmit the encrypted configuration file to a mobile device having an electromagnetic transmitter that sends the encrypted configuration file to the electromagnetic receiver of the non-configured network addressable device, wherein the encrypted configuration file is read by the non-configured network addressable device and the configuration settings of the non-configured network addressable device are set to values of the encrypted configuration file.

17. A system as in claim 16, wherein the memory device includes instructions that, when executed by the processor, causes the system to execute a configuration user interface that enables authorized entities to access the encrypted configuration file and to customize the encrypted configuration file according to user permissions.

18. A system as in claim 16, wherein the memory device includes instructions that, when executed by the processor, causes the system to:
   obtain customer network credentials used to connect the non-configured network addressable device to a customer network from a customer account;
   send the customer network credentials to a short-range wireless network device; and
   provide customer network credentials to the non-configured network addressable device via a short-range wireless network established between the non-configured network addressable device and the short-range wireless network device.

19. A system as in claim 16, wherein the mobile device transmits the encrypted configuration file to the electromagnetic receiver of the non-configured network addressable device using a short-range wireless network.

20. A system as in claim 16, wherein the non-configured network addressable device obtains customer network credentials for a customer network from another network addressable device via a short-range wireless network and uses the customer network credentials to connect to the customer network.

21. A computer implemented method, comprising:
   obtaining a device identifier for a non-configured network addressable device from the non-configured network addressable device;
   requesting a configuration file associated with the device identifier from a configuration distribution service that manages the configuration file on behalf of a first entity, and a computing service provider hosts the configuration distribution service,
   wherein the configuration distribution service allows at least a second entity to access and modify the configuration file according to authorization specifications provided by the first entity that allows the second entity included in a distribution chain of a non-configured network addressable device to modify a customizable configuration setting of the non-configured network addressable device, and the configuration file includes a configuration customization provided by the second entity;

receiving, via a network, the configuration file that is to be applied to configuration settings of the non-configured network addressable device; and transmitting the configuration file to the non-configured network addressable device, wherein the configuration file is read by the non-configured network addressable device and the configuration settings of the non-configured network addressable device are set to values of the configuration file.

22. A method as in claim 21, wherein requesting the configuration file from the configuration distribution service further comprises requesting the configuration file via an API (Application Programming Interface) for the configuration distribution service.

* * * * *